(12) United States Patent
Menzel et al.

(10) Patent No.: US 7,079,656 B1
(45) Date of Patent: Jul. 18, 2006

(54) METHOD AND COMMUNICATIONS SYSTEM FOR CIPHERING INFORMATION FOR A RADIO TRANSMISSION AND FOR AUTHENTICATING SUBSCRIBERS

(75) Inventors: Christian Menzel, Maisach (DE); Ralf Haferbeck, Unterschleissheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/581,359

(22) PCT Filed: Dec. 2, 1998

(86) PCT No.: PCT/DE98/03545

§ 371 (c)(1),
(2), (4) Date: Jun. 9, 2000

(87) PCT Pub. No.: WO99/33299

PCT Pub. Date: Jul. 1, 1999

(30) Foreign Application Priority Data

Dec. 18, 1997 (DE) .............................. 197 56 587

(51) Int. Cl.
*H04L 9/00* (2006.01)
*H04K 1/00* (2006.01)

(52) U.S. Cl. .................... 380/283; 380/270; 726/27
(58) Field of Classification Search ............... 380/283, 380/247
See application file for complete search history.

(56) References Cited

U.S. PATENT DOCUMENTS

| | | | | |
|---|---|---|---|---|
| 4,654,480 A | * | 3/1987 | Weiss ......................... | 713/181 |
| 5,371,794 A | * | 12/1994 | Diffie et al. ................. | 713/156 |
| 5,457,734 A | * | 10/1995 | Eryaman et al. .......... | 455/553.1 |
| 5,467,398 A | * | 11/1995 | Pierce et al. .................. | 380/44 |
| 5,469,496 A | * | 11/1995 | Emery et al. ................ | 455/461 |
| 5,517,187 A | * | 5/1996 | Bruwer et al. ............. | 340/5.26 |
| 5,559,886 A | | 9/1996 | Dent et al. | |
| 6,014,563 A | * | 1/2000 | Szabo ...................... | 455/435.1 |

OTHER PUBLICATIONS

"Safety First bei europaweiter Mobilkommunikation", telcom report 16 (1993), No. 6, pp. 326-329.

* cited by examiner

*Primary Examiner*—Kambiz Zand
(74) *Attorney, Agent, or Firm*—Morrison & Foerster LLP

(57) ABSTRACT

The subject matter of the invention proceeds from an encryption of the information for the radio transmission in an access network (ACN) as well as an authentication in at least one core network (CON1, CON2). Inventively, public keys (PUK1-MT, PUK-BS) are mutually transmitted between a mobile station (MT) and the base station (BS) via the radio interface (AI), and the public key (PUK1-MT or PUK-BS) received by the base station (BS) or mobile station (MT) is employed for the encryption of the information to be subsequently sent via the radio interface. On the basis of a private key (PRK1-MT, PRK1-BS) that is allocated to the transmitted, public key (PUK1-MT, PUK-BS) in the mobile station (MT) or in the base station (BS), the encrypted information received by the mobile station or base station can be deciphered. Following the encryption procedure, a subscriber identity mobile card (SIM) of the mobile station implements the authentication of the respective core network (CON1, CON2), and authentication equipment (AC, AC') of the core network implements the authentication of the subscriber on the basis of the mutually transmitted, encrypted information.

15 Claims, 2 Drawing Sheets

METHOD AND COMMUNICATIONS SYSTEM FOR CIPHERING INFORMATION FOR A RADIO TRANSMISSION AND FOR AUTHENTICATING SUBSCRIBERS

BACKGROUND OF THE INVENTION

1. Field of the Invention

The invention is directed to a method for the encryption of information for a radio transmission and for authentication of subscribers in a communication system and is also directed to a corresponding communication system.

2. Description of the Related Art

Communication systems such as the mobile radio telephone system according to the GSM standard (global system for mobile communication) use a radio interface for wireless information transmission. Connections between mobile stations and base stations of a mobile radio telephone network can be setup, released and maintained on this radio interface. A method and a system for encryption (ciphering) information for radio transmission and for subscriber authentication are known from the article "Safety First bei europaweiter Mobilkommunikation" telcom report 16 (1993), No. 6, pages 326 through 329. In this article, the mobile subscribers identify themselves with respect to the mobile radio telephone network using a subscriber identity mobile (SIM) card/that is contained in the radio telephone subscriber station. At the network side, the mobile subscriber is registered in a an authentication means (authentication center)/ that respectively offers security parameters and security algorithms for the protection of the subscriber data of the mobile subscribers. The encryption of the information on the radio interface takes place in a subscriber-related manner and is directly coupled to the subscriber authentication.

In future communication systems, such as a universal network (UMTS, universal mobile telecommunication system or UPT, universal personal communication), there is a tendency to divide the infrastructure into an access network and into one or more core networks. The area of the access network in these system's responsible for matters of the radio interface such as administration and allocation of the radio channels, channel encoding, encryption via the radio interface. By contrast, the area of the core network is mainly responsible for matters of the subscriber administration such as registration (subscription), authentication, selection of the access network, etc., as well as for offering services. An encryption of the information for the radio transmission independently of the core network is impossible in the current GSM system. Over and above this, a radio resource, for example the radio channel, is exclusively used for only one subscriber in the encryption, namely the subscriber that was authenticated at the moment. This is no longer adequate for future communication systems, particularly given a simultaneous use of a mobile station by a plurality of subscribers (for example, with their SIM cards).

SUMMARY OF THE INVENTION

The invention is based on the object of specifying a method and a communication system that enables an encryption of the information at the radio interface independently of the nature and plurality of core networks, enabling a functional separation of encryption and authentication.

This object is inventively achieved by a method for encryption of information for a radio transmission and for authentication of subscribers in a communication system that comprises an access network having equipment for the radio transmission, the communication system further comprising at least one core network having a respective authentication equipment for the subscriber authentication, the method comprising the steps of allocating a radio channel for the transmission of the information via a radio interface from/to at least one base station of the access network, mutually transmitting public keys between a mobile station and the base station via the radio interface, encrypting subsequent information to be transmitted via the radio interface using one of the public keys received by the base station or the mobile station, deciphering encrypted information received by the mobile station or the base station on the basis of a private key that is allocated to the transmitted, public key in the mobile station or in the base station, and authenticating the core network via a subscriber identity mobile card of the mobile station, and authenticating the subscribers via the authentication equipment of the core network on the basis of encrypted information that have been mutually sent.

This object is also achieved by a communication system for encryption of information for a radio transmission and for authentication of, comprising an access network having equipment for the radio transmission as well as at least one core network, the core network having a respective authentication equipment for the subscriber authentication, the communication system utilizing a radio channel for transmission of the information via a radio interface from/to at least one base station of the access network, memory devices in a mobile station and in the base station for storing public keys and private keys that are allocated to the public keys, transmitters in the mobile station and in the base station for mutually sending the public keys via the radio interface, controllers in the mobile station and in the base station for encryption of the information to be subsequently sent via the radio interface upon employment of the public keys received by the base station or, respectively, the mobile station and for deciphering the received, encrypted information on the basis of the stored, appertaining private key the mobile station comprising a subscriber identity mobile card for authenticating the core network, the core network comprising an authentication equipment for authenticating the subscribers; and the authenticating the core network and the authenticating the subscribers utilizing mutually transmitted, encrypted information.

The subject matter of the invention proceeds from an encryption of the information for the radio transmission in an access network as well as from an authentication in at least one core network. Inventively, public keys are transmitted in alternation between a mobile station that can be used in parallel by a plurality of subscribers and the base station, being sent via the radio interface, and the public key received by the base station or the mobile station is employed for the encryption of the information to be subsequently transmitted via the radio interface. The encrypted information received by the mobile station or the base station can be deciphered on the basis of a private key that is allocated in the mobile station or the in the base station to the public key that was transmitted. Following the deciphering procedure, the authentication of the respective core network is implemented by a component/equipment of the mobile station, and the authentication of the subscriber is implemented by a component/equipment of the core network on the basis of the encrypted information transmitted in alternation.

As a result of the mutual transmission of public keys between mobile station and base station, the encryption for the radio transmission can take place in mobile station-related manner instead of a subscriber-related manner and, thus, can simultaneously ensue for a plurality of subscribers. There is a bidirectional, trusted relationship into which an "apparent" base station or an unauthorized base station cannot intervene. Another advantage is the functional separation of access network/(responsible for encryption); and core network, (responsible for authentication). The radio resource is multiply utilized for the encryption of a plurality of subscribers at the mobile station. The information required for the authentication procedure can already be transmitted encrypted, which was not possible in the previous GSM system. Maximum security is achieved by the combination of the encryption with public/private keys at the mobile station level and the following authentication at the subscriber level. In particular, a plurality of core networks—potentially of different network types—can be connected parallel to the access network due to the functional separation of access network and core network, and, in particular, a plurality of subscribers having different identities (SIM cards) can communicate simultaneously via a mobile station and in different core networks.

No third party can subsequently sneak into the secure connection, achieved by multiple, mutual transmission of the public keys. The following authentication assures that the respective partner device of the connection—i.e., the base station from the point of view of the mobile station or, respectively, the mobile station from the point of view of the base station—is also in fact the device that it pretended to be at the beginning of the communication.

An advantageous development of the invention provides that the mobile station first sends a first public key to the base station which uses this key for the encryption of the information, and a public key is sent from the base station to the mobile station that employs it for the encryption of the information. Subsequently, the mobile station sends a second public key to the base station. The involvement of an "apparent" base station or of the unauthorized base station into the connection is thus dependably prevented at the radio interface. The second key thereby preferably replaces the first key.

According to an alternative development of the invention, the base station first sends a first public key to the mobile station, which employs it for encryption of the information, and the mobile station sends a public key to the base station, which employs it for the encryption of the information. Subsequently, the base station sends a second public key to the mobile station. The involvement of the "apparent" base station or of the unauthorized base station in the connection is thus dependably prevented at the radio interface. The second key is thereby preferably replaced by the first key.

It is advantageous according to another development of the invention that the mobile station sends a subscriber identity of the subscriber and an authentication request to the core network in encrypted form and receives an authentication reply from the core network sent back to it in encrypted form. Subsequently, the mobile station implements an authentication procedure for checking the identity of the core network. A network authentication thus occurs at the side of the mobile station which can be individually implemented particularly for a plurality of core networks dependent on where the subscriber is registered.

The core network preferably sends an authentication request in addition to the authentication reply in encrypted fashion, and an authentication reply is sent back to the mobile station in encrypted form. Subsequently, the core network can implement an authentication procedure for checking the subscriber identity. This has the advantage that the request for checking the subscriber authentication can be co-transmitted with the reply of the core network to the network authentication and can be initiated by the core network immediately upon arrival of the reply.

A communication system according to the invention comprises memory as a mobile station that can be used in parallel by a plurality of subscribers and of the base station for storing public keys and private keys that are allocated to the public keys. Transmission devices in the mobile station and in the base station implement the mutual transmission of the public keys via the radio interface. Control devices in the mobile station and in the base station are provided for the encryption of the information to be subsequently transmitted via the radio interface upon employment of the public key received from the base station or mobile station and for deciphering the received, encrypted information on the basis of the stored, appertaining private key. Over and above this, the communication system comprises a subscriber-specific authentication mechanism in the mobile station and a controller in the respective core network for the implementation of the authentication of the core network as well as of the authentication of the subscribers on the basis of mutually transmitted, encrypted information.

BRIEF DESCRIPTION OF THE DRAWINGS

The invention is explained in greater detail below on the basis of an exemplary embodiment with reference to the graphic illustration.

DESCRIPTION OF THE PREFERRED EMBODIMENTS

Figure 1:
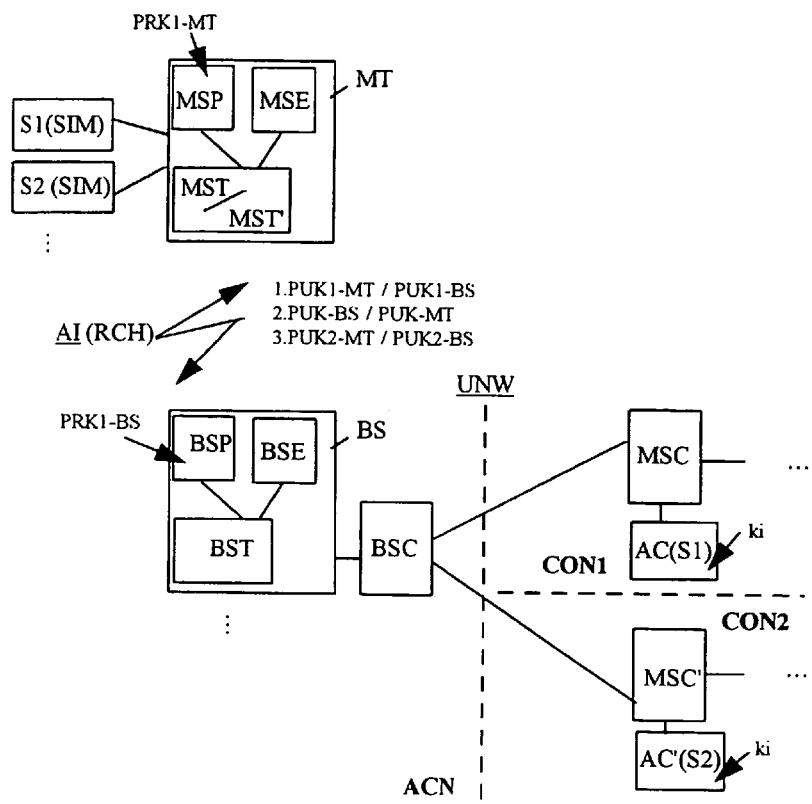
FIG. 1 is a block circuit diagram of a communication system with an access network for the radio transmission and a plurality of core networks for the authentication.

The communication system show in FIG. 1 is a universal communication system UNW—such as a universal UMTS or UPT network (universal mobile telecommunication system or universal personal telecommunication)—whose infrastructure is divided into an access network ACN and into one or more core networks CON1, CON2. The area of the access network ACN having devices of a radio subsystem—such as base stations BS and base station controllers BSC connected to it—is responsible for matters of the radio interface such as administration and allocation of radio channels, channel encoding, encryption via the radio interface, etc. The area of the core network CON1, CON2 with network equipment—such as switching equipment MSC, MSC' and authentication equipment AC, AC'—is mainly responsible for matters of routing, of subscriber administration such as registration (subscription) of the subscribers S1, S2 as well as authentication, selection of the access network ACN, etc., and for offering services. The authentication procedures in the authentication equipment AC, AC' preferably use secret keys ki according to the known procedure of the GSM standard in order to implement the subscriber authentication for the subscriber S1 registered in the core network CON1 and for the subscriber S2 registered in the core network CON2 in parallel and independently of the access network ACN.

In the present example, the switching equipment MSC, MSC' in the core networks CON1 and CON2 are connected to the base station controller BSC of the access network ACN. The base station controller BSC enables the connection to at least one base station, to the base station BS in the present example. Such a base station BS is a radio station that is provided for coverage of a radio area—for example, of a radio cell—in order to setup, release and maintain connections from/to at least one mobile station MT that resides in its radio area via radio interface AI. The information are contained in a radio channel RCH allocated by the base station controller BSC. The connections can be a matter of outgoing connections as well as of incoming connections. The mobile station MT in the present example is especially suited for simultaneous use by a plurality of subscribers S1 and S2 that are attached in parallel to an internal bus (not shown) on the basis of their subscriber-specific devices SIM (subscriber identity module) and each have a respectively separate subscriber identity.

The mobile station MT comprises a memory MSP, a transmitter and receiver MSE as well as control devices MST, MST' that are connected to the memory means MSP and transmitter and receiver means MSE. Likewise, the base station BS comprises a memory BSP, a transmitter and Receiver BSE as well as a BST that is connected to the memory BSP and transmitter and receive.

According to the invention, the mobile station MT MSE—sends a first public key PUK1-MT via the radio interface AI in parallel for all subscribers active at it and makes note of an appertaining, private key PRK1-MT that is deposited in the memory MSP or in the controller MST. The base station BS employs the received, public key PUK1-MT for the encryption of the information to be subsequently sent via the radio interface AI. The deciphering of the information sent by the base station BS is thus only possible for the entity that knows the appertaining private key, i.e., the mobile station MT with the key PRK1-MT. The base station in turn sends a public PUK-BS in the reply of the base station BS in the opposite direction to the mobile station MT and makes note of the appertaining private key PRK1-BS. The memory BSP or the controller BST stores the private key PRK1-BS. It is thus assured that information subsequently sent by the mobile station MT to the base station BS, which are encrypted upon employment of the public key PUK1-BS, can only in turn be deciphered by the base station BS or its controller BST.

In order to prevent an "apparent" base station or unauthorized base station from using the public key PUK1-MT communicated from the mobile station MS for sending correctly encrypted information, arbitrarily or intentionally, the mobile station MT sends a second public key PUK2-MT (already encrypted) to the base station BS via the radio interface AI. This key PUK2-MT can only be read and employed by the correct base station BS with which a trusted relationship was initially set up on the mobile station level. The "apparent" base station or unauthorized base station is dependably suppressed in this method. The second public key PUK2-MT thus replaces the previous, first public key PUK1-MT. The same is true in the other transmission direction when the mutual transmission of the keys was initiated by the base station BS.

The encryption procedure can likewise be initiated by the base station BS, so that the transmitter and receiver BSE sends a first public key PUK1-BS to the mobile station MT which has a private key PRK1-BS allocated to it and stored in the controller BST or in the memory BSP. The mobile station MT employs the arriving, public key PUK1-BS for encryption of the information that follows it and in turn sends a public key PUK-MT to the base station BS that employs it for the encryption of the information in the opposite direction. Subsequently, the base station BS preferably sends a second public key PUK2-BS to the mobile station MT in order to be absolutely certain that an undesired base station does not mix itself into the encrypted information transmission via the radio channel or eaves drop. The public as well as the private keys are composed, for example, of a numerical sequence or bit sequence.

Figure 3:
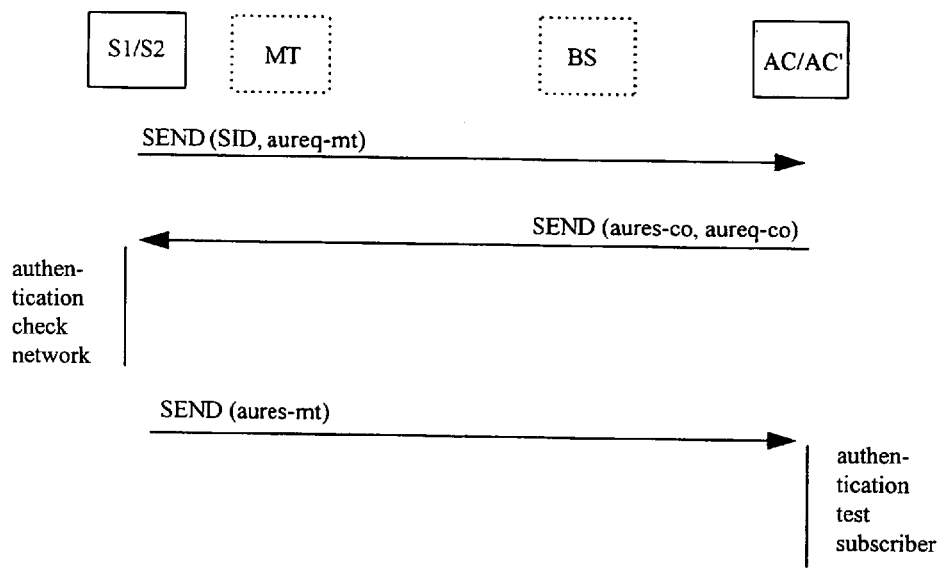
FIG. 3 is a message flow diagram for the authentication of the subscribers and of the core networks between the mobile station and the respective core network.

Following the encryption procedure, the mobile station MT-preferably, the subscribe identity mobile card SIM provided only for the authentication or a control means MST responsible in common for encryption and authentication— implements the authentication of the respective core network CON1, CON2, and the authentication equipment AC, AC' of the core network CON1, CON2 implements the authentication of the subscriber S1, S2 on the basis of mutually transmitted, encrypted information at the subscriber level (see FIG. 3). The bidirectional authentication is thus implemented independently of the access network ACN. The authentication appended to the encryption offers maximum security since it assures that the cooperating entity of the connection is in fact the entity that it identified itself at the beginning of the communication. This prevents the overall communication on this connection from having been initiated by an "apparent" base station or unauthorized base station. Another advantage of the functional separation of encryption and authentication is that the subscriber identities and the information required for the authentication— for example, random number RAND, and signed response SRES according to a GSM method—can already be transmitted encrypted via the radio interface AI. Authentication procedures deviating from GSM methods can also be employed for the authentication.

A plurality of core networks, the two core networks CON1, CON2 in the present example, even if different network types, can be connected parallel to the access network ACN. The subscribers S1, S2 simultaneously work with different SIM cards via the one mobile station MT in different core—networks—in the two core networks CON1, CON2 in the present example—or, respectively, one or more subscribers S1, S2 work in a single core network, for example CON1. Furthermore, the functional separation of the access network ACN and the core network CON1, CON2 also supports configurations in which the access network ACN and the core network or networks CON1, CON2 exhibit different network operators.

Figure 2:
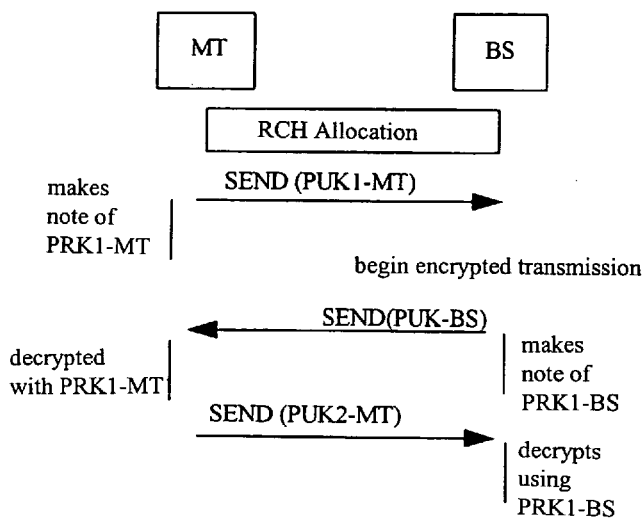
FIG. 2 is a message flow diagram for the encryption of the information at the radio interface between a mobile station and a base station of the access network.

In a schematic illustration, FIG. 2 shows the message flow for encryption of the information for the radio transmission between the mobile station MT and the base station BS of the access network. This example is limited in that the mutual exchange of the keys is initiated by the mobile statio MT. The base station BS could likewise begin the exchange (also see the description for FIG. 1); the following message flow would then be executed in a corresponding way.

After the allocation of the radio channel RCH for a connection setup for communication, the mobile station MT starts the encryption in that it transmits the public key PUK1-MT in a message SEND and makes note of the appertaining, private key PRK1-MT. The encrypted transmission of the information has thus begun at the radio interface. The base station BS uses the arriving key PUK1-MT for encrypted information transmission in the opposite direction, and in turn transmits the public key PUK-BS in the message SEND. It also makes note of the private key PRK1-BS belonging to the public key PUK-BS. The information transmitted in encrypted form—at least the public key PUK-BS in the present case—can only be deciphered by the mobile station MT with the assistance of the private key PRK1-MT that is only known to it. After the deciphering, the mobile station MT sends a second public key PUK-MT to the base station BS in a further message SEND, this base station BS deciphering the arriving information—at least the second public key PUK2-MT in the present case—with the assistance of the private key PRK1-BS that is only known to it. The second public key PUK2-MT thereby replaces the previous, first public key PUK1-MT A trusted relationship has thus been produced between the two devices and third parties are not capable of penetrating this relationship.

In a schematic illustration, FIG. 3 shows the message flow for authentication of the subscribers S1, S2 registered in different core networks and for authentication of the respective core network. Messages are transmitted between the subscribers S1, S2 using the mobile station MT and the network equipment AC, AC' (authentication center) of the respective core network, and are transmitted transparently for the access network and the base station of it.

First, the subscriber S1 or, respectively, the mobile station MT transmits an authentication request aureq-mt via the subscriber identity mobile card (SIM) for the subscriber and a subscriber identity SID in the message SEND to the authentication equipment of the core network responsible for the subscriber S1. The transmission of the information takes place in encrypted format. In the opposite direction, the authentication equipment AC returns an authentication reply aures-co in the message SEND to the mobile station MT that implements the authentication procedure—with, preferably, a secret key—for checking the authentication for the core network. With the authentication reply aures-co, an authentication request aureq-co is preferably simultaneously co-transmitted from the authentication equipment AC of the core network in encrypted form and is received by the mobile station MT. In response, the mobile station returns an authentication reply aures-mt in the message SEND to the authentication equipment AC in encrypted form and subscriber-related. The authentication equipment AC implements the authentication procedure for checking the subscriber authentication—in a likewise, manner preferably, upon employment of secret keys. An authentication in only one direction—i.e., only for the subscribers or for the network—is also fundamentally possible.

The executive sequence for the authentication of the subscriber S2 takes place in a corresponding way by exchanging messages SEND having the above contents between the corresponding, subscriber identity mobile card (SIM) of the mobile station MT and the authentication equipment AC of the other core network responsible for it. As a result of the combination of encryption at the radio interface from/to the access network, achieved on the basis of repeatedly exchanged public keys on the mobile station level, and following the authentication using secret keys on the subscriber level from/to the core network independently of the access network, maximum security is achieved. The access network (responsible for the encryption) and the core network or networks (responsible for authentication), nonetheless remain functionally separate.

The above-described method and communication system are illustrative of the principles of the present invention. Numerous modifications and adaptions thereof will be readily apparent to those skilled in this art without departing from the spirit and scope of the present invention.

What is claimed is:

1. A method for encryption of information for a radio transmission and authentication of subscribers in a communication system that comprises an access network having equipment for said radio transmission, said communication system comprising a core network having a respective authentication equipment for said subscriber authentication, comprising:

allocating a radio channel for said transmission of said information via a radio interface from/to a base station of said access network;

mutually transmitting public keys between a mobile station and said base station via said radio interface;

encrypting subsequent information to be transmitted via said radio interface using one of said public keys received by said base station or said mobile station;

deciphering encrypted information received by said mobile station or said base station on the basis of a private key that is allocated to said transmitted, public key in said mobile station or in said base station; and authenticating said core network via a subscriber identity mobile card of said mobile station, and authenticating said subscribers via said authentication equipment of said core network on the basis of encrypted information that have been mutually sent.

2. A method according to claim 1, further comprising the steps of:

sending a first public key from said mobile station to said base station;

encrypting information to be sent to said mobile station using said first public key by said base station, sending an other public key from said base station to said mobile station;

encrypting information to be sent to said base station using said other public key by said mobile station, and sending a second public key to said base station by said mobile station subsequent to said step of sending said other public key from said base station.

3. A method according to claim 2, further comprising replacing said first public key with said second public key sent to said base station.

4. A method according to claim 1, further comprising:

sending a first public key from said base station to said mobile system;

encrypting information to be sent to said base station using said first public key by said mobile station;

sending an other public key from said mobile station to said base station;

encrypting information to be sent to said mobile station using said other public key by said mobile station; and sending a second public key to said mobile station by said base station subsequent to said step of sending said other public key from said mobile station.

5. A method according to claim 4, further comprising replacing said first public key with said second public key sent to said base station.

6. A method according to claim 1, further comprising sending a subscriber identity of said subscriber and an authentication request by said mobile station to said core network in encrypted form;

returning, by said authenticating equipment of the core network, an authentication reply in encrypted form; and implementing, by said mobile station, an authentication procedure for checking an identity of said core network.

7. A method according to claim 6, further comprising:
sending an authentication request in addition to said authentication reply in encrypted form by said authenticating equipment of said core network;
returning, by said mobile station, an authentication reply to said authenticating equipment of said core network in encrypted form; and
checking said subscriber identity by an authentication procedure implemented by said authenticating equipment of said core network.

8. A method according to claim 1, further comprising implementing said authentication procedure utilizing secret keys.

9. A method according to claim 1, further comprising:
servicing, by said access network at least two core networks in parallel; and
registering and authenticating in different core networks a subscriber that can use said mobile station in parallel.

10. A method according to claim 1, further comprising:
servicing, by access network, a core network in which a plurality of subscribers that can use said mobile station in parallel are registered and authenticated.

11. A method according to claim 1, wherein said access network and said core network or multiple core networks are administered by different network operators.

12. A communication system for encryption of information for a radio transmission and for authentication of subscribers, comprising:
an access network having equipment for said radio transmission and a core network, said core network having a respective authentication equipment for said subscriber authentication, said communication system utilizing a radio channel for transmission of said information via a radio interface from/to a base station of the access network;
memory devices in a mobile station and in said base station for storing public keys and private keys that are allocated to said public keys;
transmitters in said mobile station and in said base station for mutually sending said public keys via said radio interface; and
controllers in said mobile station and in said base station for encryption of said information to be subsequently sent via said radio interface upon employment of said public keys received by said base station or, respectively, said mobile station and for deciphering received, encrypted information on the basis of said stored, appertaining private key,
said mobile station comprising a subscriber identity mobile card for authenticating said core network, and
said core network comprising an authentication equipment for authenticating said subscribers;
and said authenticating said core network and said authenticating said subscribers utilizing mutually transmitted, encrypted information.

13. A communication system according to claim 12, wherein said access network has at least two core networks connected in parallel for registration and authentication of a subscriber that can use said mobile station in parallel in different core network.

14. A communication system according to claim 12, wherein said access network has a core network connected for registration and authentication of a plurality of subscribers that can use said mobile station in parallel.

15. A communication system according to claim 12, wherein said access network and said core network or multiple core networks are administered by different network operators.

\* \* \* \* \*